United States Patent
Landry

(10) Patent No.: US 11,274,536 B2
(45) Date of Patent: Mar. 15, 2022

(54) METHOD AND APPARATUS FOR THERMAL FLUID GENERATION FOR USE IN ENHANCED OIL RECOVERY

(71) Applicant: Vipera, Inc., Cheyenne, WY (US)

(72) Inventor: James Landry, Lafayette, LA (US)

(73) Assignee: VIPERA, INC., Cheyenne, WY (US)

( * ) Notice: Subject to any disclaimer, the term of this patent is extended or adjusted under 35 U.S.C. 154(b) by 270 days.

(21) Appl. No.: 16/395,886

(22) Filed: Apr. 26, 2019

(65) Prior Publication Data

US 2019/0330966 A1 Oct. 31, 2019

Related U.S. Application Data

(60) Provisional application No. 62/663,517, filed on Apr. 27, 2018.

(51) Int. Cl.
*E21B 43/16* (2006.01)
*E21B 43/24* (2006.01)
*E21B 43/243* (2006.01)

(52) U.S. Cl.
CPC .......... *E21B 43/243* (2013.01); *E21B 43/166* (2013.01); *E21B 43/2406* (2013.01); *E21B 43/24* (2013.01)

(58) Field of Classification Search
CPC .... E21B 43/166; E21B 43/24; E21B 43/2406; E21B 43/2408; E21B 43/243
See application file for complete search history.

(56) References Cited

U.S. PATENT DOCUMENTS

| | | | |
|---|---|---|---|
| 4,772,775 A | | 9/1988 | Leach |
| 4,833,293 A | | 5/1989 | O'Hare |
| 5,210,392 A | * | 5/1993 | Labrot ............... H05H 1/38 219/121.52 |
| 2008/0236817 A1 | * | 10/2008 | Tillman ............ E21B 43/2401 166/251.1 |
| 2009/0064581 A1 | | 3/2009 | Nielsen et al. |
| 2010/0072404 A1 | * | 3/2010 | Vera ................. H05H 1/48 250/493.1 |
| 2013/0062188 A1 | | 3/2013 | Dighe et al. |
| 2014/0209573 A1 | | 7/2014 | Foret |
| 2015/0382441 A1 | | 12/2015 | Rao et al. |
| 2016/0348895 A1 | | 12/2016 | Juranitch |

OTHER PUBLICATIONS

PCT International Search Report and Written Opinion dated Jul. 1, 2019 (copy attached).

\* cited by examiner

*Primary Examiner* — Robert E Fuller
*Assistant Examiner* — Lamia Quaim
(74) *Attorney, Agent, or Firm* — Ted M. Anthony

(57) ABSTRACT

A thermal fluid generator utilizes a plasma energy heat source to generate steam, and combine the steam with nitrogen gas. Combined flow streams of steam and heated nitrogen are injected downhole into subterranean reservoir to thermally stimulate the flow of hydrocarbons (such as, for example, residual oil) from a reservoir, while also increasing fluid pressure in the reservoir. The thermal fluid generator can be located at the earth's surface, or positioned downhole within a wellbore.

9 Claims, 10 Drawing Sheets

SECTION "A-A"

METHOD AND APPARATUS FOR THERMAL FLUID GENERATION FOR USE IN ENHANCED OIL RECOVERY

BACKGROUND OF THE INVENTION

1. Field of the Invention

The present invention pertains to a thermal fluids generator that utilizes at least one plasma energy heat source to convert a stream of liquid into a gaseous state (and, in some cases, combine said converted stream with at least one separate gas stream) for enhanced oil recovery operations. More particularly, the present invention pertains to an apparatus for generating a thermally heated fluid and introducing said fluid into subterranean strata (typically hydrocarbon-bearing reservoirs). More particularly still, the present invention pertains to a means for controlling mass flow rate and inlet temperatures of fluid input stream(s) in order to moderate the output flow rate and temperature of output fluid stream(s).

2. Description of Related Art

Various enhanced oil recovery (EOR) techniques have been used to facilitate the extraction of hydrocarbons (and, particularly, heavy crude oil) from subterranean reservoirs. Although such EOR techniques can be used in any number of different situations or circumstances, EOR technology is frequently utilized to extract residual hydrocarbons that cannot be recovered from subterranean formations using other conventional production means. Generally, such EOR techniques fall within three basic categories: thermal techniques, gas injection techniques, and chemical injection techniques.

Thermal EOR techniques typically involve the injection of heated fluid—frequently steam—into subterranean hydrocarbon-bearing reservoir(s) in order to stimulate production of hydrocarbons there from. In such cases, injected steam decreases the viscosity of the heavy oil, while often increasing the permeability of the reservoir rock, in order to improve fluid flow conditions through an underground formation.

One common type of thermal EOR technique is known as steam assisted gravity drainage ("SAGD"). Pursuant to the SAGD method, steam is injected into at least one injection well; in many cases, said at least one injection well includes an extended horizontal or lateral section that is deviated from vertical orientation. The steam is injected through said injection well into an underground reservoir. As the steam is injected into said reservoir, the heat from the steam improves the viscosity characteristics of the residual oil in the reservoir. Eventually, the steam cools and condenses to form water that, in turn, mixes with said oil or other hydrocarbons in the reservoir. The oil and water mixture is permitted to drain (typically using gravity) to at least one production well that is situated at a structurally lower location than said at least one injection well. The oil and water mixture is produced to the earth's surface through said at least one production well where it can be separated for subsequent disposition.

Another common type of thermal EOR technique is frequently referred to as "steam flooding". Such steam flooding can generally be accomplished via either multiple wells, or a single well. When multiple wells are utilized, steam is typically injected into an underground reservoir via at least one injection well. As the steam flows through the rock, the heat from the steam improves the viscosity characteristics of the residual oil situated in the reservoir. The steam eventually condenses and mixes with said oil, while the pressure from the steam injection often acts to "push" the hydrocarbons through the reservoir. In this manner, the oil and water mixture flows through the subterranean formation to at least one beneficially-positioned production well. The oil and water mixture can then be produced to the earth's surface through said at least one production well where it can then be separated for subsequent disposition.

When a single well is utilized, the method is often referred to as a "huff and puff" cycle. Initially, steam is injected into an underground reservoir via said single well during at least one injection phase. Thereafter, said well is temporarily shut-in. During this shut-in period, heat from said injected steam acts on residual oil in the reservoir, improving the viscosity characteristics of the oil. The steam eventually condenses, forming water that mixes with said residual oil in the reservoir. After a predetermined period of time, the well is opened and the oil and water mixture is produced through said well to the earth's surface where it can be separated for subsequent disposition.

Other non-thermal EOR systems have been developed that utilize plasma pulses that are directed into a reservoir. Generally, the plasma pulse EOR technology requires lowering a plasma pulse generator into a wellbore at the depth of production perforations. Once lowered to the desired depth in the wellbore, a plasma jet is created that emits a burst of energy that lasts for a fraction of a second; the burst of energy creates hydraulic impulse acoustic waves that act to clean out said perforations. The waves continue to resonate beyond the perforations and out into the reservoir, exciting fluid molecules in the reservoir and causing an increase in mobility of said reservoir fluids. Although this method can be used to improve hydrocarbon production, it does not involve the generation of steam or widespread in situ thermal effects.

Existing thermal fluid generators typically rely on conventional combustion mechanisms to heat fluids. Such conventional thermal fluid generators require a great deal of heat in order to produce heated fluids (typically steam) for injection into subterranean reservoirs. In order to generate such heat, conventional combustion thermal fluid generators generally require a great deal of fuel to generate, and conventional fluid heating operations are frequently very inefficient. Thus, there is a need for a highly effective and fuel-efficient generator for heating fluid for injection during EOR operations.

SUMMARY OF THE INVENTION

The present invention pertains to a novel approach to thermal EOR technology wherein a plasma energy heat source is used to generate steam, and combine said steam with nitrogen. The combined flow streams of steam and heated nitrogen are injected downhole into subterranean rock in order to thermally stimulate oil production within a reservoir, while also increasing fluid pressure within said reservoir. The combination of thermal stimulation (typically by improving viscosity characteristics of reservoir liquids) and increased fluid pressure in the subterranean reservoir cooperate to drive residual oil to at least one wellbore take-point for extraction from the reservoir.

In a preferred embodiment, the present invention comprises an apparatus for generating steam by directly heating a liquid (typically water) stream that is beneficially directed into a corona of a plasma torch. Said plasma torch can generate an ionized gas stream that can reach temperatures in excess of 10,000 degrees Kelvin; said temperatures are significantly higher than can be achieved with conventional heating systems operating on conventional fuel. Further, the high temperature ionized gas from a plasma torch can be linearly expelled from said torch into a very high temperature gas stream.

At least one inert gas (such as, for example, nitrogen) can also be injected into said thermal fluid generator; as such, the discharge output from said thermal fluid generator comprises a mixture of high temperature, high quality steam and inert gas. The combined gas flow can be injected (typically through a well bore) into a subterranean formation as part of a thermal EOR system. The thermal fluid generator of the present invention can be used with virtually any thermal EOR process (e.g., SAGD, or single or multi-well steam flooding).

In a preferred embodiment, inputs into the thermal fluid generator of the present invention generally comprise inert gas (such as, for example, nitrogen), de-ionized water, and electrical energy. Inert gas can be provided from compressed storage tanks or, in the case of nitrogen, from an on-site nitrogen generator that produces nitrogen from ambient air. In such cases, a single nitrogen generating system can provide nitrogen that can serve as feed stock for a plasma torch, as well as for injection into the torch shroud. Likewise, de-ionized water can be supplied via storage tanks, or processed on-site using a water filtration and de-ionizing system. High voltage electrical power can be provided via connection to a power supply grid or, alternatively, generated on site via a portable electrical generating system.

System controls allow for the dynamic operational control of substantially all input parameters including, without limitation, power level of a plasma torch, nitrogen flow rate through said torch, cooling water flow rate through said torch, flow rate of water injected into the thermal fluid generator for the production of steam, flow rate of inert gas (such as, for example, nitrogen) into the shroud (in addition to gas supplied as input to said torch). Independent control of said input parameters provides operational control of output parameters including, without limitation, temperature, flow rate and relative mixture of steam and inert gas. Such operational control is frequently important to match particular reservoir and operational conditions in order to optimize results.

The present invention also permits the selective addition of desired chemicals into gases that are output from the thermal fluid generator, thereby permitting injection of said chemicals deeper into a reservoir than is currently achievable with direct injection methods. A further advantage of the present invention is that the system can blend gases that could possibly be relatively too hot to be injected directly into the reservoir with gases that are relatively too cold to be of benefit. As a result, blending of said gases of different temperatures allows flexibility to fit a desired temperature range based on requirements of a particular reservoir.

In addition to increased heating capacity, the thermal fluid generator of the present invention provides a number of important advantages over conventional combustion steam generation systems. For example, such conventional combustion systems generally require some or all of the following: ready access to air to be used as an oxidant; fuel to be burned to generate heat; and water to be used for feedstock (i.e., to convert into steam) and as a coolant to cool the combustion device.

When natural gas is used for fuel for a conventional combustion device, suitable natural gas fuel is seldom available at a well site; if such fuel gas is not readily available, a pipeline must be constructed or other transportation systems must be employed, which can have a dramatically negative impact on project economics. Further, such natural gas typically must be dried and stripped of hydrogen sulfide (H2S) and other impurities before it can be fed to a combustion torch. In the event that diesel fuel is used as the combustion fuel, transportation and storage of large volumes of diesel fuel can be problematic in many locations. Further, combustion of diesel fuel can be relatively inefficient, and can have negative impact on the surrounding environment.

By contrast, with the thermal fluid generator of the present invention, feed stock is produced and controlled on-site. No fuel or oxidant is required to propagate a flame. Rather, the only power requirement is electricity, which can be generated onsite using a portable electric generator. Nitrogen can be produced on-site using a nitrogen membrane generator, while some or all of the water feed stock can be generated from the drying process during the separation of oxygen from said nitrogen.

Additionally, use of a plasma torch heat source permits the thermal fluid generator of the present invention to be downhole within a wellbore. In certain applications, positioning said thermal fluid generator downhole may improve overall system efficiency compared to conventional surface deployment configurations. In such cases, heat loss along the surface and extended in-ground piping is frequently reduced or entirely eliminated by such downhole deployment.

Because the plasma torch of the present invention is capable of generating significantly more heat than conventional combustion devices, the power intake of said plasma torch is relatively small which, in turn, reduces the overall size requirements of the plasma torch. Furthermore, when desired, the energy generated by said torch can be increased by creating "constriction" (sometimes referred to as a "plasma pinch"), by injecting water directly into the corona of the plasma, and by electro magnifying the torch nozzle by running electrical current through the copper coils that surround said nozzle. Creation of an electromagnetic field compresses the energy of the plasma torch corona, allowing for greater heat to be produced (or, alternatively, a reduction in the electrical energy required in order to generate the same heat output). In this manner, the thermal fluid generator of the present invention requires less electrical input which, in turn, reduces the operating cost and size requirements of said thermal fluid generator, thereby allowing said device to be positioned and operated downhole within a wellbore. The plasma heat source for the present invention beneficially uses significantly less (approximately 1%) of the gas required by a comparable fuel gas system.

BRIEF DESCRIPTION OF THE DRAWINGS

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

Figure 1:
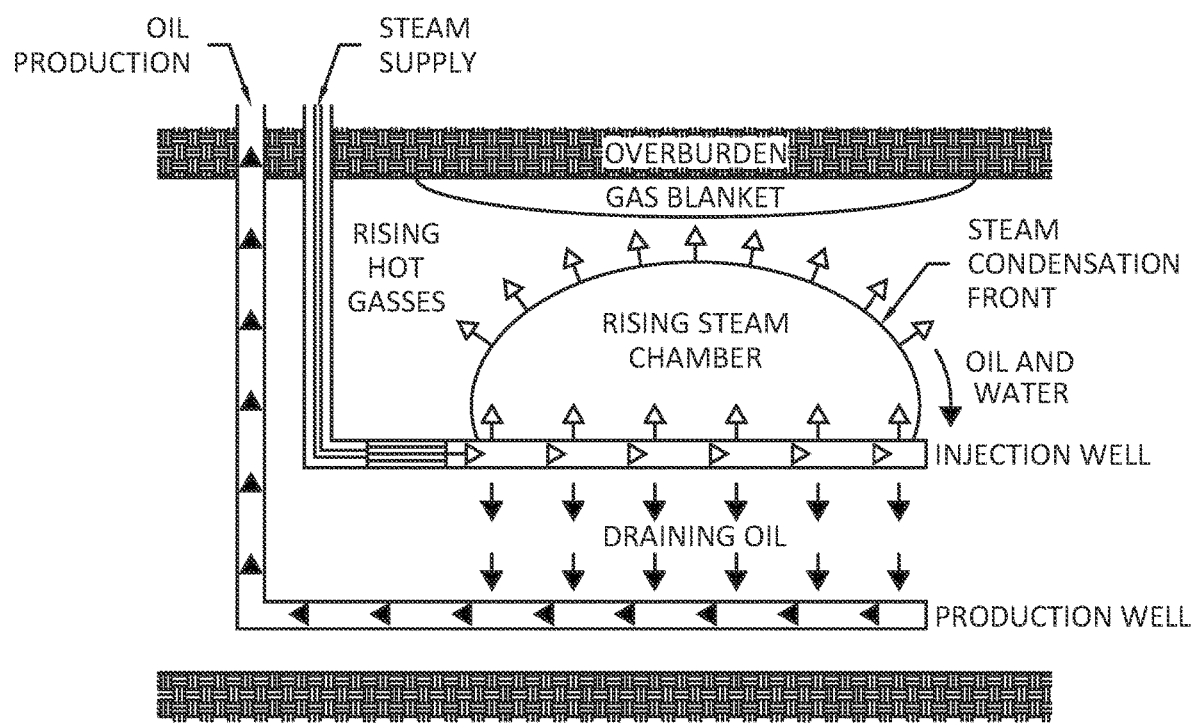
FIG. 1 depicts a side schematic view of a prior art Steam Assisted Gravity Drainage (SAGD) embodiment of a thermal fluids EOR system.

FIG. 1 depicts a side schematic view of a prior art Steam Assisted Gravity Drainage (SAGD) embodiment of a thermal fluids EOR system. Pursuant to the SAGD method, steam is injected into at least one injection well. As depicted in FIG. 1, said at least one injection well includes an extended horizontal or lateral section that is deviated from vertical orientation. Steam is injected through said injection well into an underground reservoir. As the steam is injected into said reservoir, the heat from the steam improves the viscosity characteristics of oil in the reservoir. Eventually, the steam cools and condenses to form water that, in turn, mixes with said oil or other hydrocarbons in the reservoir. The oil and water mixture is permitted to drain (typically using gravity) to at least one production well that is typically situated at a structurally lower location than said at least one injection well. The oil and water mixture is produced to the earth's surface through said at least one production well where it can be separated for subsequent disposition.

Figure 2:
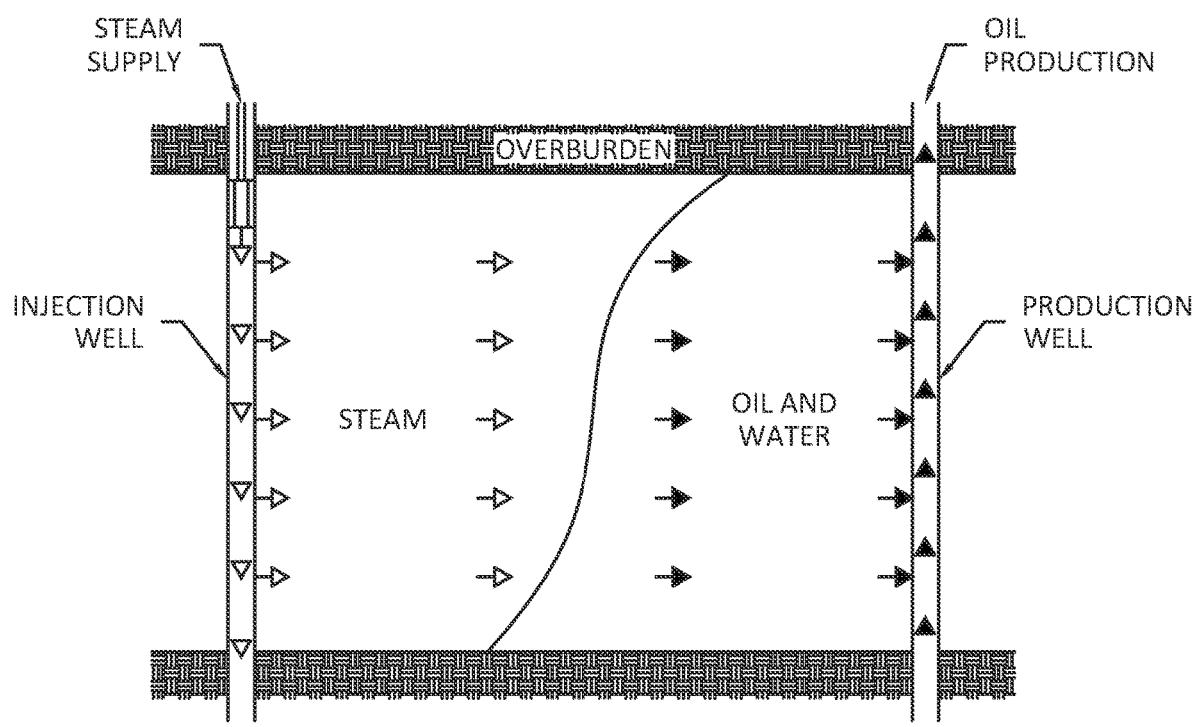
FIG. 2 depicts a side schematic view of a prior art multi-well configuration of a steam drive embodiment of a thermal fluids EOR system.

FIG. 2 depicts a side schematic view of a prior art multi-well configuration of a thermal fluids system used in "steam flooding" EOR operations. When multiple wells are utilized, as depicted in FIG. 2, steam is typically injected into an underground reservoir via at least one injection well. Heat from the steam improves the viscosity characteristics and "flow-ability" of oil situated in the reservoir. The steam eventually condenses and mixes with said oil, while the pressure from the steam injection often acts to displace the hydrocarbons through the reservoir. In this manner, the oil and water mixture flows through the subterranean formation to at least one beneficially-positioned production well. The oil and water mixture can then be produced to the earth's surface through said at least one production well where it can then be separated for subsequent disposition.

Figure 3:
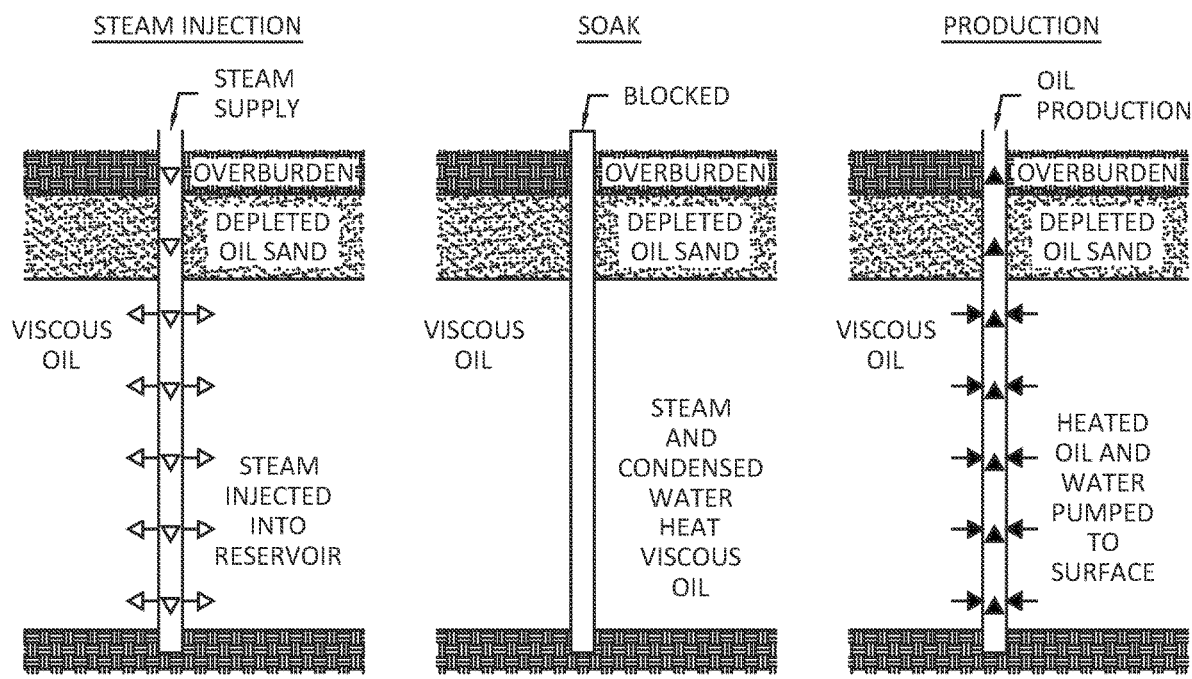
FIG. 3 depicts a side schematic view of a prior art single wellbore cyclic stimulation ("Huff and Puff") configuration of a steam drive embodiment of a thermal fluids EOR system.

FIG. 3 depicts a side schematic view of a prior art single well configuration of a thermal fluids system used in "steam flooding" EOR operations and, more particularly, a cyclic stimulation ("Huff and Puff") system. Initially, steam is injected into an underground reservoir via a single well during at least one injection phase. Thereafter, said well is temporarily shut-in for a predetermined intermediate "soaking" period. During this intermediate shut-in period, heat from the injected steam acts on oil within the reservoir, improving viscosity characteristics of the oil. The steam eventually condenses, forming water that mixes with said oil in the reservoir. After a predetermined period of time, the well is opened for a production period wherein the oil and water mixture is produced through said well to the earth's surface where it can be separated for subsequent disposition.

Figure 4:
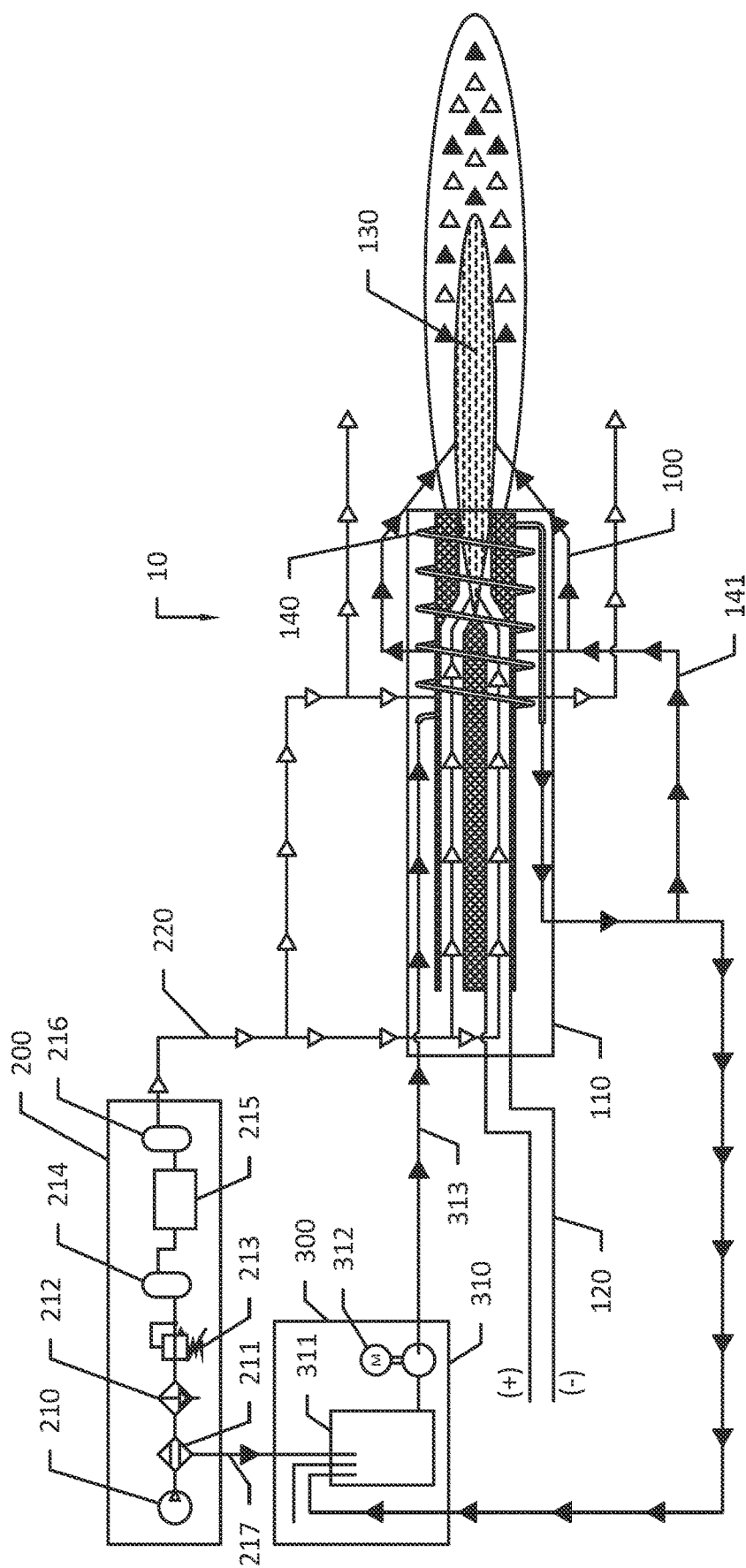
FIG. 4 depicts a schematic view of a (plasma) thermal fluid generator assembly of the present invention, including an exemplary configuration for delivering nitrogen and de-ionized water feedstock(s) to said generator assembly.

FIG. 4 depicts a schematic view of a plasma thermal fluid generator assembly 10 of the present invention, including an exemplary configuration for delivering nitrogen and de-ionized water feedstock(s) to said generator. Said plasma thermal fluid generator assembly 10 can be utilized for generating large volumes of high temperature steam. In a preferred embodiment, steam generated from said plasma thermal fluid generator assembly 10 can be injected into a subterranean hydrocarbon reservoir in connection with a conventional EOR system; however, it is to be observed that said plasma thermal fluid generator assembly 10 can be used in connection with other applications without departing from the scope of the present invention. In the embodiment depicted in FIG. 4, said plasma thermal fluid generator assembly 10 generally comprises plasma steam generator assembly 100, nitrogen generator assembly 200 and water supply assembly 300.

Plasma steam generator assembly 100 comprises plasma torch 110 which is typically configured for non-transfer mode of operation. Said plasma torch 110 utilizes electrical (energy supplied by electrical input line 120) to excite a stream of gas into an ionized plasma state, forming plasma jet 130, also sometimes referred to as a corona. The ionized portion of the gas often reaches temperatures in the range of 10,000 degrees Kelvin (17,540 degrees Fahrenheit). However, only a relatively small portion of the plasma jet stream 130 is in the ionized state, typically only 1% of the stream. In a preferred embodiment, the temperature of the gas in the stream outside of the ionized central core is considerably less than in said core; the temperature of the central core of ionized gas decreases as the gas moves away from the plasma torch and mixes with lower temperature arc gas.

Nitrogen generator assembly 200 is used to provide nitrogen gas feed stock to plasma torch 110. Said nitrogen generator assembly 200 can comprise virtually any acceptable means for generating nitrogen and supplying said to plasma torch 110. In a preferred embodiment, said nitrogen generator assembly 200 comprises a conventional membrane-type nitrogen generator that can be used to extract desired volumes of nitrogen at a high flow rate from the surrounding atmosphere (typically ambient air). Said nitrogen generator assembly 200 comprises separate means to collect, compress and store the compressed air in storage tank(s).

In the embodiment depicted in FIG. 4, nitrogen generator assembly 200 comprises air compressor 210, air dryer 211, air filter 212, air regulator 213, air storage tanks 214, membrane nitrogen generator 215 and nitrogen storage tank(s) 216. Pressurized, dried and filtered air from air storage tank 216 flows through membrane nitrogen generator 215; said membrane nitrogen generator 215 separates nitrogen from the air. Nitrogen generated by membrane nitrogen generator 215 is subsequently stored in storage tank(s) 216, which can supply a high flow rate stream of separated nitrogen to plasma torch 110 via nitrogen supply line/conduit 220 in a manner more fully described below.

Still referring to FIG. 4, water supply assembly 300 supplies water to plasma torch 110; in a preferred embodiment, said water supply assembly 300 comprises bulk water inlet (supply) line 310, storage tank 311, pump 312 and water supply line 313. In one embodiment, water generated using air dryer 211 can be piped or transferred to storage water supply assembly 300 using conduit 217, thereby reducing or eliminating water supply requirements from other water source(s). In a preferred embodiment, water supplied to plasma torch 110 is circulated through a cooling loop 140 disposed around some or all of plasma torch 110 in order to cool said plasma torch 110. Further, in a preferred embodiment, said water supply is beneficially de-ionized and, therefore, electrically nonconductive.

Electrical input requirements for plasma torch 110 are supplied via electrical transmission 120. A power supply (not shown) is provided for the conversion of AC power to high voltage DC power. In a preferred embodiment, said power supply can comprise a portable diesel generator or other suitable electricity supply. Additionally, an arc starter (not shown) can be provided to supply sufficient voltage to stimulate ionization with sufficient DC current to selectively start plasma torch 110.

De-ionized water exiting cooling loop 140 can be heated by the heat energy generated by plasma torch 110. Some or all of said de-ionized water flow stream existing said cooling loop 140 is redirected via line 141 toward the output plasma jet 130 of plasma torch 110; heat energy from said plasma torch 110 causes said de-ionized water to form high temperature steam 400. The resulting stream of high temperature steam 400 can be comingled and/or mixed with nitrogen discharged from the thermal fluid generator assembly.

In operation, at least one sensor is provided for real-time measurement and monitoring of system conditions at desired location(s) within said system. At least one programmable controller continuously monitors information sensed by said at least one sensor (including, for example, output parameters such as steam heat, fluid mixture quality, steam volume and/or other variables). Said at least one programmable controller receives, interprets and/or responds to information sensed by said at least one sensor, thereby permitting changes to output conditions by dynamically adjusting input(s) to plasma torch 110 and/or operational controls of said plasma torch 110 to achieve desired output parameters; said input(s) to plasma torch 110 can include, without limitation, electrical power in, cooling water flow rate and input gas flow rate. Additionally, said at least one controller can be manually operated.

Figure 5:
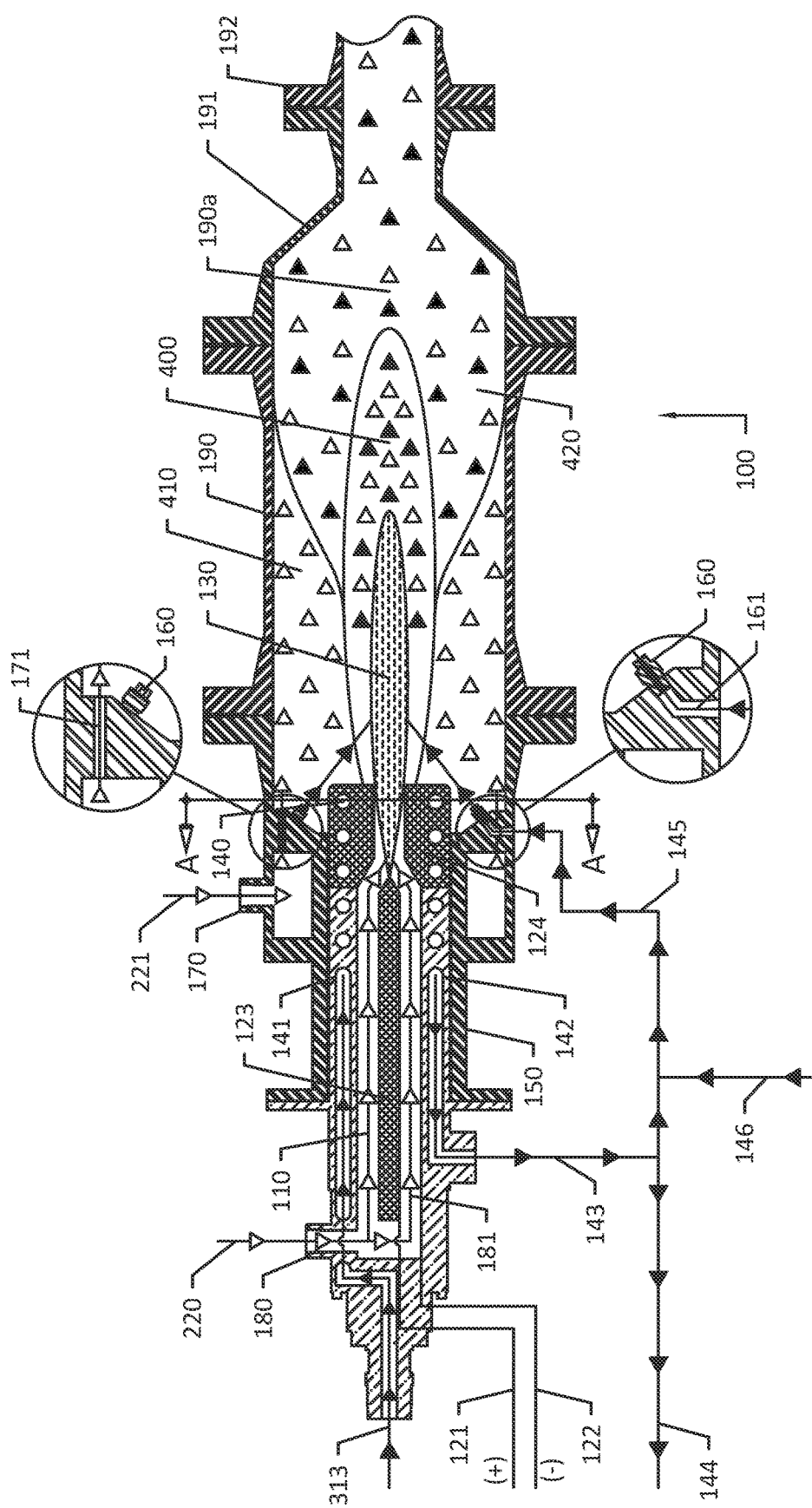
FIG. 5 depicts a side sectional view of a plasma steam generator assembly of the present invention, including a housing for receiving fluids discharged from said steam generator assembly.

FIG. 5 depicts a side sectional view of a plasma steam generator assembly 100 of the present invention including, without limitation, plasma torch 110, shroud member 150, housing 190 (defining an inner chamber 190*a*), bell/swage connection 191 and piping/conduit 191. Fluids discharged from said plasma steam generator assembly 100 are substantially contained and collected within inner chamber 190*a* of housing 190. Said discharged fluids flow from the inner chamber of housing 190, through bell/swage connection 191, and into piping/conduit 192 that can be in fluid communication with at least one wellbore, such as via a conventional piping or manifold system not depicted in FIG. 5. In this manner, the high temperature fluid mixture (steam and nitrogen) discharged from plasma steam generator assembly 100 can be selectively delivered to said at least one wellbore via said piping or manifold system, and injected into at least one subterranean reservoir via said at least one wellbore.

Generally, torch shroud member 150 comprises a mounting support structure for plasma torch 110, as well as a manifold-like conduit assembly to selectively direct water and nitrogen flow streams to desired locations and orientations relative to said plasma torch 110, and the output therefrom. In a preferred embodiment, water is directed through directionally oriented nozzles 160, disposed in spaced arrangement, to form a converging frustoconical stream or spray pattern of water at or into plasma jet 130 output from said plasma torch 110. Heat from said plasma jet 130 contacting said water stream flowing through said nozzles 160 results in the generation of high temperature steam. Additionally, shroud member 150 further comprises an annular space generally surrounding plasma torch 110 and water discharge nozzles 160. Outlet ports in the face of said shroud member 150 direct a high velocity stream of nitrogen gas into inner chamber 190*a* of housing 190, generally in the vicinity of steam generated at or near the outlet of plasma torch 110.

Referring to FIG. 5, a stream of de-ionized water is provided from a water source (such as, for example, de-ionized water generator assembly 300 depicted in FIG. 4) via water supply line 313. Said de-ionized water flows through conduit(s) in shroud member 150 until it enters cooling loop 140 at loop inlet 141; said water passes through cooling loop 140 until it exits said cooling loop 140 at outlet 142. In a preferred embodiment, said cooling loop 140 substantially encompasses some or all of plasma torch 110 so that said de-ionized water can provide a thermal cooling effect to plasma torch 110.

Water exiting outlet 142 of cooling loop 140 is directed through water outlet conduit 143, wherein some or all of said flow stream of water stream is directed into nozzle supply conduit 145. Depending on water volume and/or flow rate requirements, a portion of the water flow stream may be selectively diverted to return conduit 144, which can direct said water back to a water supply assembly, disposal facility or other location for further handling. Water flowing into nozzle supply conduit 145 enters nozzle inlet port(s) 161 and flows through conduit(s) in shroud member 150 until said water flows to a plurality of directionally-oriented nozzles 160.

By way of illustration, it is to be observed that the present invention may comprise a single water inlet port 161 wherein said water is piped within said shroud 150 to a plurality of nozzles 160. Alternatively, shroud 150 may include a plurality of water inlet ports 161, wherein water is routed directly from each inlet port 161 to an associated nozzle 160 or group of nozzles 160. In a preferred embodiment, chemicals or other additives can be optionally added to said water stream through chemical injection conduit 146 prior to said water stream being directed to nozzle inlet port(s) 161.

Electrical positive terminal 121 and negative terminal 122 are electrically connected to plasma torch 110 and provide electrical power to ignite and operate said plasma torch 110. Power can be supplied via a portable electrical generator, electrical supply grid or other conventional means. Positive cathode 123 and the negative anode 124 are disposed within plasma torch 110, which is configured to operate in a "non-transfer mode" as opposed to a "transfer mode".

Still referring to FIG. 5, a stream of gas (typically nitrogen) is provided from a gas supply assembly (such as, for example, nitrogen generator assembly 200 depicted in FIG. 4) via supply line conduit 220. Gas supplied to torch 110 via torch supply line conduit 220 enters at least one inlet port 180 in shroud 150 and is directed through at least one conduit 181 to plasma torch 110; gas from said at least one conduit 181 is fed to plasma torch 110 for generating an ionized plasma stream (output from said torch 110). A secondary stream of gas (typically nitrogen) is also provided from a gas supply assembly (such as, for example, nitrogen generator assembly 200 depicted in FIG. 4) via secondary supply line conduit 221. Gas supplied via secondary supply line conduit 221 enters at least one inlet port 170 in shroud 150 and is directed through at least one conduit 171 into inner chamber 190*a* of housing 190 (separate from nitrogen supplied to torch 100 via conduit 181 to generate an ionized plasma stream).

Plasma jet (corona) 130 is depicted exiting the output of plasma torch 110, as would be the case when plasma steam generator assembly 100 is operating. Extending beyond said plasma jet 130 is high temperature stream of steam 400 that is created when de-ionized water is injected through nozzles 160 at or into said plasma corona 160. A blanket of nitrogen 410 surrounds said stream of steam 400 within inner chamber 190*a* of housing 190; said nitrogen blanket 410 is generally injected via conduits 171 into the annular space formed between steam 400 and the inner surface of housing 190. Further, said nitrogen blanket 410 mixes with steam 400 to form a mixture of nitrogen and steam 420 (and any injected chemicals or additives) within said inner chamber 190*a* of housing 190.

Heated mixture 420 is substantially contained and collected within inner chamber 190*a* of housing 190. Said heated fluids flow from the inner chamber 190*a* of housing 190, through bell/swage connection 191, and into piping/conduit 192 that can be beneficially in fluid communication with at least one wellbore, such as via a conventional piping or manifold system not depicted in FIG. 5. In this manner, the high temperature fluid mixture (steam and nitrogen) 420 can be selectively injected into at least one subterranean reservoir via said at least one wellbore.

Figure 6:
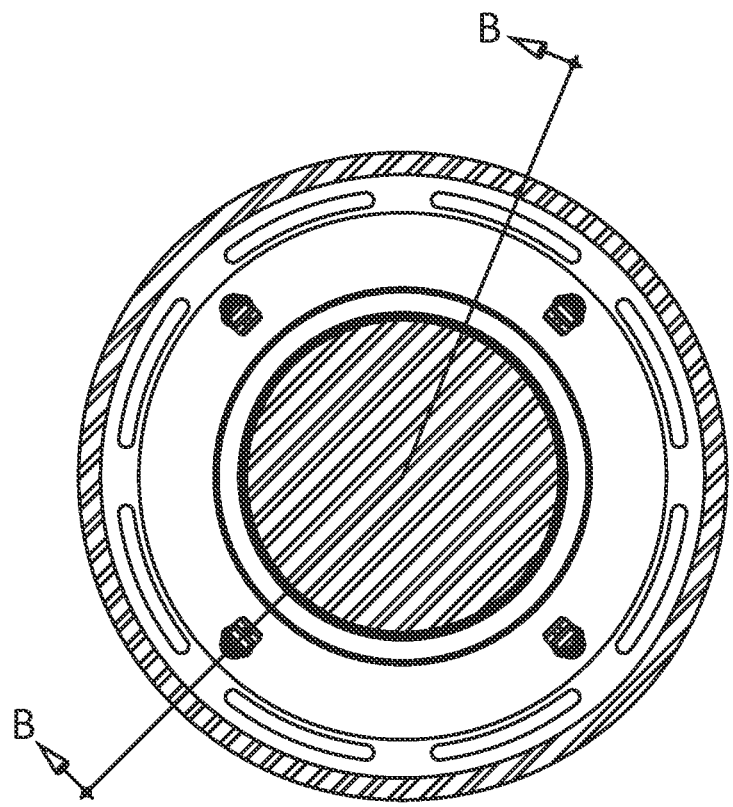
FIG. 6 depicts an end sectional view of a plasma steam generator assembly of the present invention along line A-A of FIG. 5.

FIG. 6 depicts an end sectional view of a plasma steam generator assembly 100 (and, more particularly, shroud 150 thereof) of the present invention along line A-A of FIG. 5. Central opening 131 is disposed substantially in the center of said shroud 150, while plasma jet or corona 130 (which is output from plasma torch 110) extends through said opening 131 in said shroud 150. A plurality of water injection nozzles 160 are arrayed around the outer perimeter of said opening; in a preferred embodiment, said nozzles 160 are positioned and oriented generally inward in order to beneficially direct or spray multiple streams of water to form a frustoconical spray pattern or annular ring that is directed at or toward said plasma jet stream/corona 130. Outboard of said plurality of nozzles 160 is an array of elongate shaped ports 172 in the face of shroud 150. Said shaped ports 172 are in communication with conduit(s) 171. Referring back to FIG. 5, nitrogen gas supplied via secondary supply line conduit 221 enters at least one inlet port 170 in shroud 150 and is directed through at least one conduit 171; said gas flows through said elongate shaped ports 172 depicted in FIG. 6. In this manner, said nitrogen gas forms annular nitrogen gas blanket 420 depicted in FIG. 5.

Figure 7:
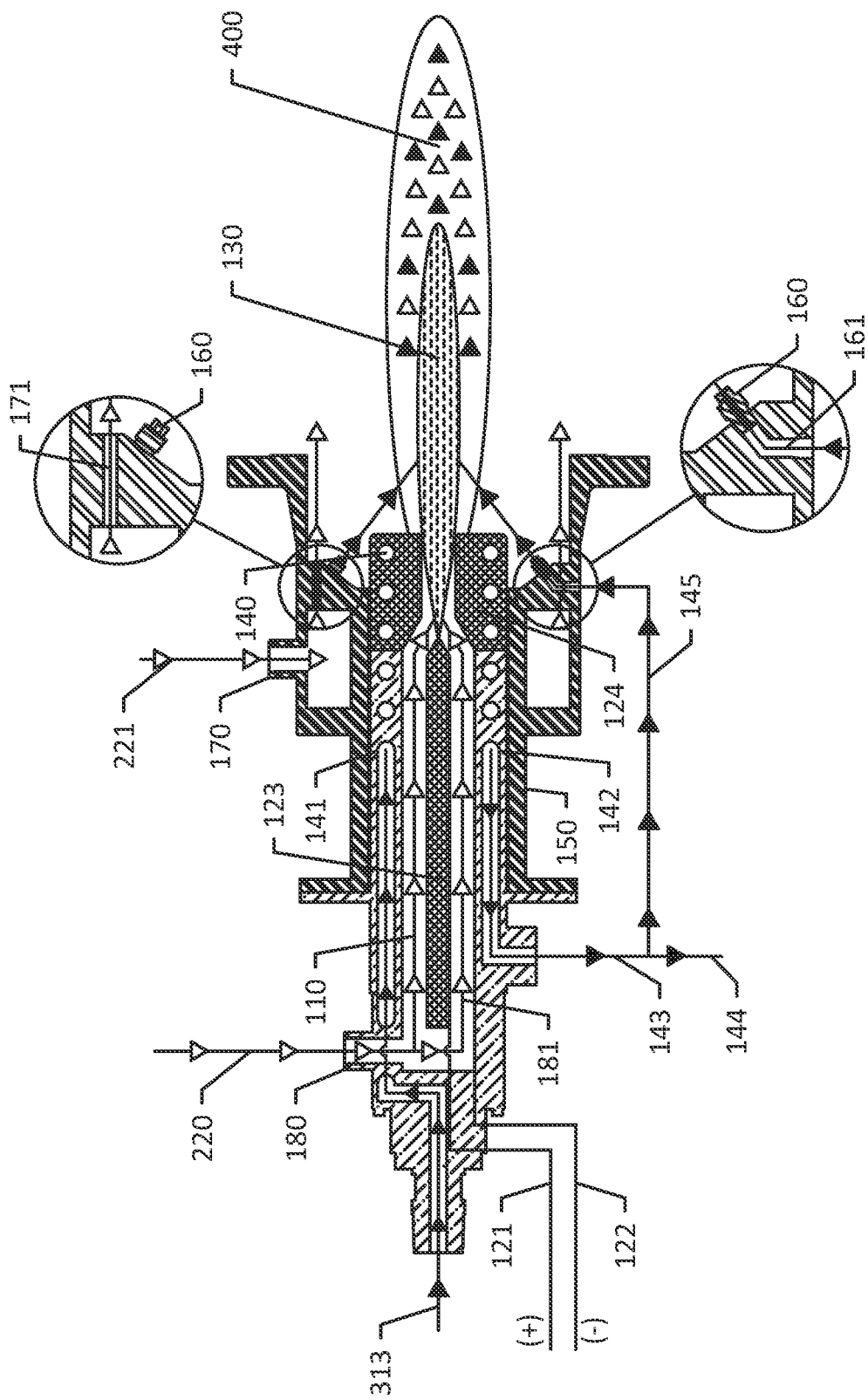
FIG. 7 depicts a side sectional view of a first embodiment plasma steam generator assembly and shroud assembly components of a thermal fluid generator assembly of the present invention.

FIG. 7 depicts a side sectional view of a first embodiment plasma steam generator assembly 100 and shroud assembly 150 components of a thermal fluid generator assembly 10 of the present invention. In this embodiment, a portion of the cooling water that is being discharged from plasma torch 110 is directed into shroud 150 to serve as the water source for water that is injected through nozzles 160 and directed into plasma jet stream/corona 130 of plasma torch 110. An important benefit of this embodiment which utilizes a portion of the cooling water from plasma torch 110 as inlet water flow to shroud 150 is that the temperature of the water discharged from cooling loop 140 and flowing through nozzles 160 is significantly elevated. As such, the amount of energy required convert said water stream into steam is reduced which, in turn, allows for operation of plasma torch 110 at a lower energy level, thereby lowering the cost of operation and increasing system cost efficiency.

Figure 8:
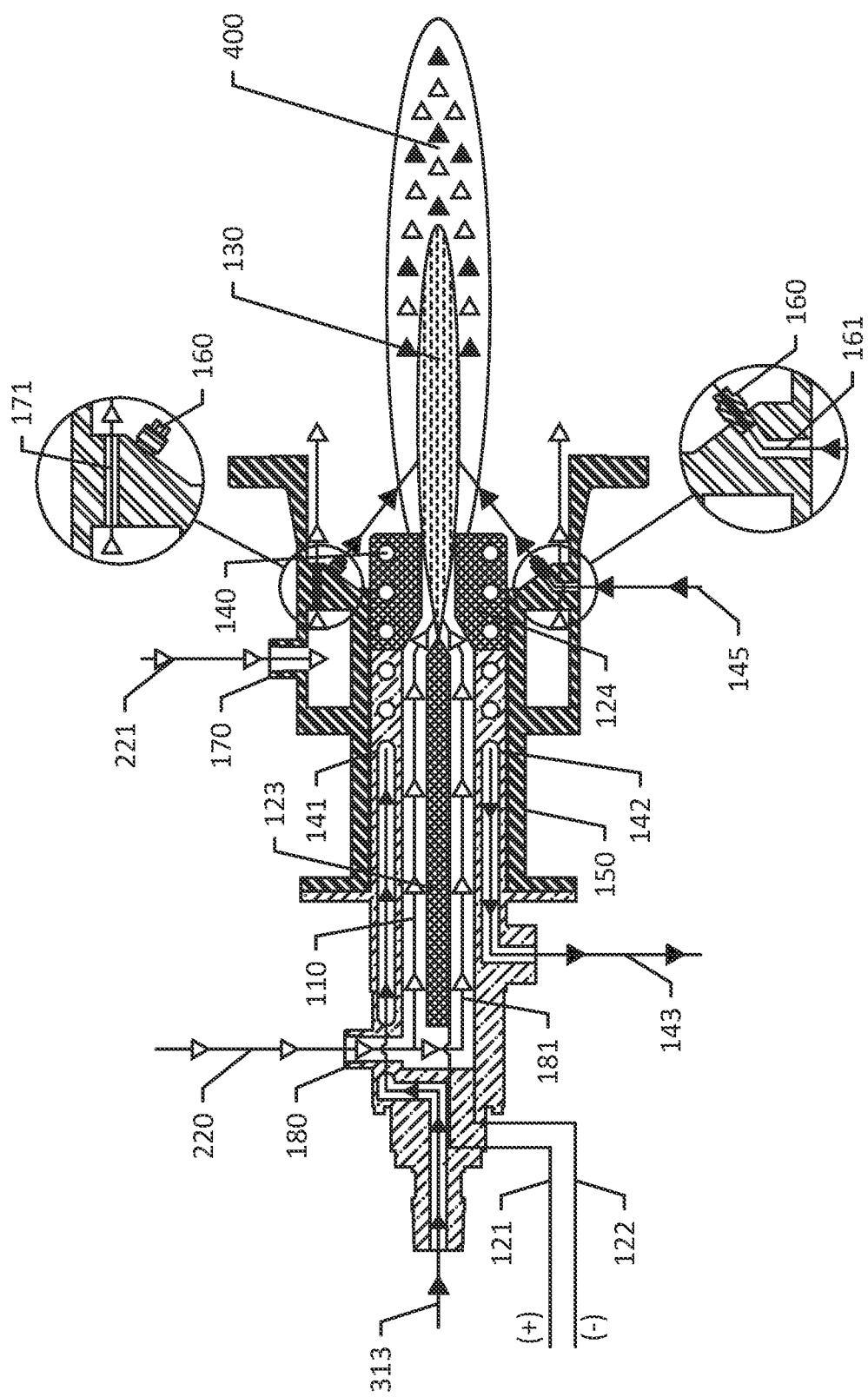
FIG. 8 depicts a side sectional view of a second embodiment of a plasma steam generator assembly and shroud assembly components of a thermal fluid generator assembly of the present invention.

FIG. 8 depicts a side sectional view of a second embodiment of a plasma steam generator assembly 100 and shroud assembly 150 components of a thermal fluid generator assembly of the present invention. In the embodiment depicted in FIG. 8, substantially all of the cooling water that is circulated through cooling loop 140 is returned to a heat exchanger in order to bring the temperature of the water desired temperature level required for recirculation into torch 110. In the configuration, none of the cooling water discharged from cooling loop 140 is directed immediately back the shroud for generating steam. In this arrangement all of the water feedstock for injecting into the shroud is provided directly from the water de-ionizing system.

Figure 9:
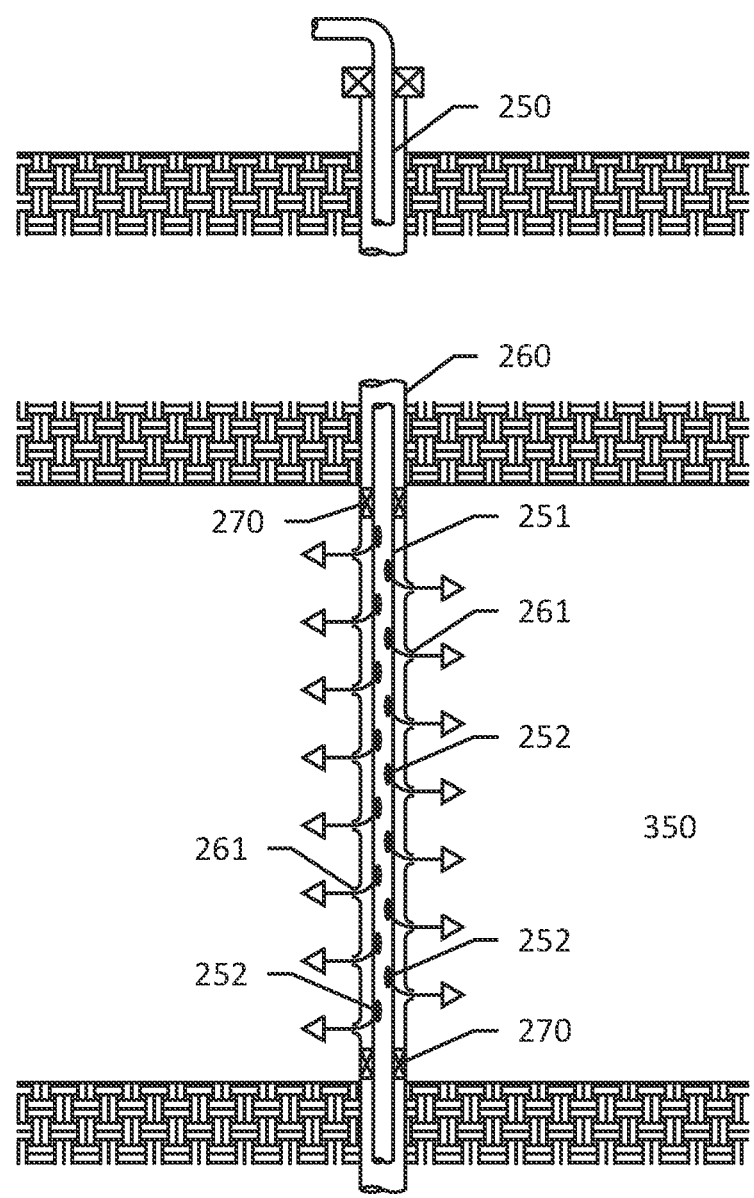
FIG. 9 depicts a side schematic view of a first embodiment of a subsurface injection operation wherein steam is generated at the earth's surface using a thermal fluid generator assembly of the present invention.

FIG. 9 depicts a side schematic view of one embodiment of a subsurface injection EOR operation wherein steam is generated at the earth's surface using a thermal fluid generator assembly of the present invention. A heated steam and nitrogen mixture is directed to a tubular string 250 that is assembled within a wellbore 260 so as to locate a section of the tubular string at the depth coinciding with the depth of an oil bearing reservoir 350 to be thermally treated. A section 251 of the tubular string 250 is positioned at or near the depth of a hydrocarbon bearing reservoir 350 in said wellbore 260. A plurality of slotted openings 252 extends through tubing section 251. Said slotted openings 252 permit fluids to flow from the interior of tubing section 251 to the exterior of said tubing section 251; alternatively, said slotted openings 252 permit fluids (such as, for example, hydrocarbons) to be produced from reservoir 350 through said tubing string 250 to the earth's surface for subsequent disposition.

In a preferred embodiment, at least one isolation packer assembly 270 is installed above tubing section 251 and subterranean reservoir 350; in some installations, at least one isolation packer assembly 270 is also installed below said reservoir 350. Said packer assembly 270 provides a seal between the exterior of tubing string 250 and the inner surface of wellbore 260 (typically casing installed in said wellbore) at or just above the depth of subterranean reservoir 350. The seal created by said isolation packer assembly 270 prevents flow of heated fluids (steam and/or associated fluids) that are directed downhole through tubing string 250 from traveling up the annular space between the exterior of tubing string 250 and the inner surface of wellbore 260. Rather, with said seal established, said fluids are directed into the subterranean reservoir 350 through perforations 261.

Figure 10:
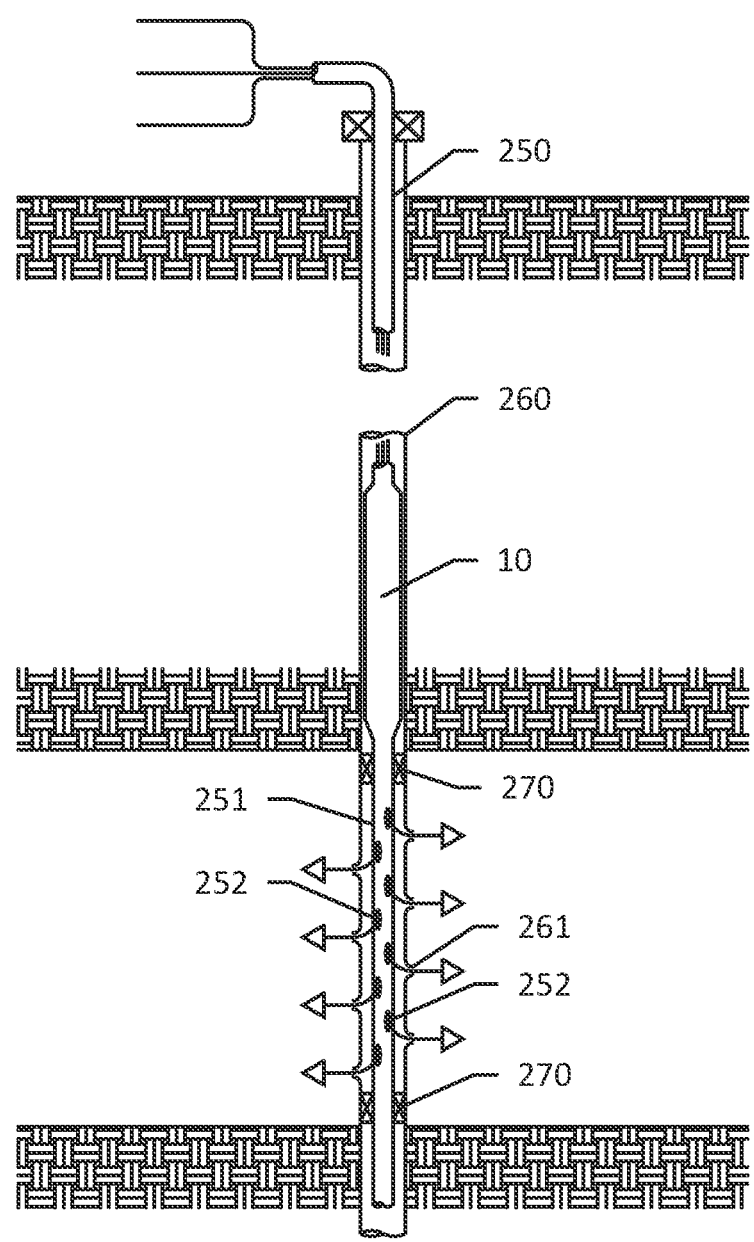
FIG. 10 depicts a side schematic view of a second embodiment of a subsurface injection operation wherein steam is generated down hole using a thermal fluid generator assembly of the present invention.

FIG. 10 depicts a side schematic view of an alternative embodiment of a subsurface injection operation wherein steam is generated down hole within wellbore 260 using a thermal fluid generator assembly of the present invention. As depicted in FIG. 10, thermal fluid generator assembly 10 is situated downhole within in wellbore 260, and is beneficially position in close proximity to (above or at the depth of) hydrocarbon bearing reservoir 350 that is to be treated. Positioning said thermal fluid generator assembly 10 downhole within wellbore 260 reduces the heat loss associated with an above ground configuration depicted in FIG. 9, thereby optimizing the efficiency of the system and allows for maximum steam temperature entering the reservoir.

Positioning said thermal fluid generator assembly 10 downhole requires that utility lines be run downhole. The utility lines consist of an electric power cable, de-ionized cooling water in and cooling water out lines as well as a gas supply line. As with the above ground configuration depicted in FIG. 9, the embodiment depicted in FIG. 10 illustrates the placement of slotted tubing section 251 at an elevation in wellbore 260 in the vicinity of reservoir 350 that is to be treated, and the use of isolation packers 270 above and below said slotted tubing section 251.

In certain circumstances (typically based on reservoir conditions), gaseous carbon dioxide ($CO_2$) can be used in place of, or in combination with, nitrogen in connection with the plasma steam generator assembly 10 of the present invention. Typically, the cost to generate $CO_2$ can be a prohibiting factor. However, in the present invention, exhaust gas from internal combustion engines can be used to supply $CO_2$; $CO_2$ generated by diesel engines driving the motors for electric generator and the nitrogen generator can be commingled into the nitrogen stream via an inductor. In some circumstances, plasma generated using $CO_2$ can be very desirable in certain oil reservoirs.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A thermal fluid generator assembly for generating heated fluid for injection into subterranean strata comprising:
    a) a shroud member defining a central opening;
    b) a plasma torch configured to generate a plasma jet extending through said central opening;
    c) a plurality of nozzles disposed around said plasma torch, wherein said nozzles are configured to spray de-ionized water toward said plasma jet stream, and wherein said de-ionized water is heated by said plasma jet stream to create steam;
    d) at least one outlet port extending through said shroud member and configured to deliver nitrogen to mix with said steam.

2. The thermal fluid generator assembly of claim 1, wherein said thermal fluid generator is positioned downhole within a wellbore.

3. The thermal fluid generator assembly of claim 1, further comprising a nitrogen generation assembly configured to extract nitrogen from ambient air and deliver said extracted nitrogen to said plasma torch or said shroud member.

4. A thermal fluid generator assembly for generating heated fluid for injection into subterranean strata comprising:
    a) a shroud member;
    b) a housing defining an inner chamber and having an outlet;
    c) a plasma torch operationally attached to said shroud member and configured to generate a plasma jet stream extending into said inner chamber of said housing;
    d) a plurality of nozzles disposed in spaced arrangement around said plasma jet stream, wherein said nozzles are configured to spray water toward said plasma jet stream in a frustoconical pattern, said water cools said plasma torch before being sprayed through said nozzles, and wherein said water is heated by said plasma jet stream to create steam;
    e) at least one outlet port extending through said shroud member, configured to deliver nitrogen to mix with said steam.

5. The thermal fluid generator assembly of claim 4, further comprising a nitrogen generation assembly configured to extract nitrogen from air and deliver said extracted nitrogen to said plasma torch or said shroud member.

6. The thermal fluid generator assembly of claim 4, wherein said thermal fluid generator is positioned downhole within a wellbore.

7. A method for stimulating the recovery of hydrocarbons from a subterranean reservoir comprising: a) providing a thermal fluid generator assembly, wherein said thermal fluid generator assembly comprises:
    i) a shroud member;
    ii) a housing defining an inner chamber and having an outlet;
    iii) a plasma torch operationally attached to said shroud member and configured to generate a plasma jet stream extending into said inner chamber of said housing;
    iv) a plurality of nozzles disposed on said shroud member in spaced relationship around said plasma torch;
    b) circulating water to cool said plasma torch;
    c) spraying water through said nozzles toward said plasma jet stream in a frustoconical spray pattern;
    d) generating steam in said inner chamber of said housing
    e) extracting nitrogen from air;
    f) delivering said extracted nitrogen to said inner chamber of said housing to mix with said steam;
    g) delivering said mixture of steam and nitrogen through said outlet of said housing; and
    h) injecting said mixture of steam and nitrogen into said subterranean reservoir.

8. The method of claim 7, wherein at least a portion of said water sprayed through said nozzles is generated during extraction of nitrogen from air.

9. The method of claim 8, wherein said thermal fluid generator assembly is positioned downhole within a wellbore.

* * * * *